(12) United States Patent
Yoon et al.

(10) Patent No.: US 9,036,818 B2
(45) Date of Patent: May 19, 2015

(54) PRIVATE KEY GENERATION APPARATUS AND METHOD, AND STORAGE MEDIA STORING PROGRAMS FOR EXECUTING THE METHODS

(71) Applicants: SAMSUNG SDS CO., LTD., Seoul (KR); SNU R&DB FOUNDATION, Seoul (KR)

(72) Inventors: Hyo Jin Yoon, Yongin-si (KR); Jung Hee Cheon, Gwacheon Si (KR); Jung Hoon Sohn, Seoul (KR)

(73) Assignees: SAMSUNG SDS CO., LTD., Seoul (KR); SNU R&DB FOUNDATION, Seoul (KR)

(*) Notice: Subject to any disclaimer, the term of this patent is extended or adjusted under 35 U.S.C. 154(b) by 59 days.

(21) Appl. No.: 13/907,139

(22) Filed: May 31, 2013

(65) Prior Publication Data
US 2013/0322621 A1 Dec. 5, 2013

(30) Foreign Application Priority Data
May 31, 2012 (KR) .................. 10-2012-0058676

(51) Int. Cl.
H04L 29/06 (2006.01)
H04L 9/08 (2006.01)
H04L 9/30 (2006.01)

(52) U.S. Cl.
CPC ............ *H04L 9/0816* (2013.01); *H04L 9/0836* (2013.01); *H04L 9/3066* (2013.01); *H04L 9/3006* (2013.01)

(58) Field of Classification Search
CPC ... H04L 9/0816; H04L 9/0836; H04L 9/3006; H04L 9/3066
USPC ............ 380/44, 277, 30, 282, 278, 28, 259, 380/286, 285, 46
See application file for complete search history.

(56) References Cited

U.S. PATENT DOCUMENTS 5,200,999 A * 4/1993 Matyas et al. ................ 380/277
5,201,000 A * 4/1993 Matyas et al. ................. 380/30
(Continued)

FOREIGN PATENT DOCUMENTS

JP 2008113201 A 5/2008
KR 1020050037723 A 4/2005
(Continued)

OTHER PUBLICATIONS

Fadlullah, Zubari Md. et al., "Toward Secure Targeted Broadcast in Smart Grid", Communication Protocols and Algorithms for the Smart Grid, IEEE Communications Magazine, May 2012, pp. 150-156.
(Continued)

*Primary Examiner* — David Garcia Cervetti
(74) *Attorney, Agent, or Firm* — Sughrue Mion, PLLC

(57) ABSTRACT

Disclosed herein are a private key generation apparatus and method, and storage media storing programs for executing the methods on a computer. The private key generation apparatus includes a root private key generation unit and a sub-private key generation unit. The root private key generation unit sets a root master key and predetermined parameters capable of generating private keys, and generates a first sub-master key set capable of generating a number of private keys equal to or smaller than a preset limited number. The sub-private key generation unit generates private keys with the root private key generation unit by receiving the first sub-master key set from the root private key generation unit, to generate a private key corresponding to a user ID using the first sub-master key set, and issues the private key to a user.

16 Claims, 5 Drawing Sheets

(56) References Cited

U.S. PATENT DOCUMENTS

| | | | |
|---|---|---|---|
| 5,519,778 A * | 5/1996 | Leighton et al. | 380/30 |
| 6,151,676 A * | 11/2000 | Cuccia et al. | 713/176 |
| 6,154,543 A * | 11/2000 | Baltzley | 380/255 |
| 6,253,322 B1 * | 6/2001 | Susaki et al. | 713/170 |
| 6,307,936 B1 * | 10/2001 | Ober et al. | 380/30 |
| 6,389,136 B1 * | 5/2002 | Young et al. | 380/28 |
| 7,320,073 B2 * | 1/2008 | Zissimopoulos et al. | 713/179 |
| 2001/0001876 A1 * | 5/2001 | Morgan et al. | 713/171 |
| 2002/0108044 A1 * | 8/2002 | Miyazaki et al. | 713/180 |
| 2003/0012386 A1 * | 1/2003 | Kim et al. | 380/286 |
| 2003/0105956 A1 * | 6/2003 | Ishiguro et al. | 713/158 |
| 2003/0120931 A1 * | 6/2003 | Hopkins et al. | 713/180 |
| 2003/0133575 A1 * | 7/2003 | Challener | 380/277 |
| 2003/0179885 A1 * | 9/2003 | Gentry et al. | 380/277 |
| 2003/0221131 A1 * | 11/2003 | Mori et al. | 713/202 |
| 2004/0146015 A1 * | 7/2004 | Cross et al. | 370/328 |
| 2004/0151309 A1 * | 8/2004 | Gentry et al. | 380/30 |
| 2004/0228485 A1 * | 11/2004 | Abu et al. | 380/44 |
| 2005/0071636 A1 * | 3/2005 | Lee et al. | 713/170 |
| 2005/0084100 A1 * | 4/2005 | Spies et al. | 380/30 |
| 2005/0089173 A1 * | 4/2005 | Harrison et al. | 380/277 |
| 2005/0157872 A1 * | 7/2005 | Ono et al. | 380/28 |
| 2005/0169464 A1 * | 8/2005 | Sannino et al. | 380/30 |
| 2005/0190912 A1 * | 9/2005 | Hopkins et al. | 380/44 |
| 2005/0195973 A1 * | 9/2005 | Ibrahim | 380/28 |
| 2005/0232428 A1 * | 10/2005 | Little et al. | 380/277 |
| 2005/0246533 A1 * | 11/2005 | Gentry | 713/170 |
| 2005/0271203 A1 * | 12/2005 | Akiyama et al. | 380/30 |
| 2006/0010324 A1 * | 1/2006 | Appenzeller et al. | 713/171 |
| 2006/0010489 A1 * | 1/2006 | Nastou et al. | 726/9 |
| 2006/0023887 A1 * | 2/2006 | Agrawal et al. | 380/277 |
| 2006/0044610 A1 * | 3/2006 | Miyata | 358/1.15 |
| 2006/0126832 A1 * | 6/2006 | Takahashi | 380/30 |
| 2006/0255910 A1 * | 11/2006 | Fukushima et al. | 340/5.65 |
| 2006/0280300 A1 * | 12/2006 | Rossini | 380/44 |
| 2007/0230705 A1 * | 10/2007 | Hanaoka | 380/277 |
| 2007/0288747 A1 * | 12/2007 | Kwan et al. | 713/156 |
| 2008/0005339 A1 * | 1/2008 | Kwan et al. | 709/229 |
| 2008/0013722 A1 * | 1/2008 | Gentry et al. | 380/44 |
| 2008/0022121 A1 * | 1/2008 | Fu et al. | 713/185 |
| 2008/0205655 A1 * | 8/2008 | Wilkins et al. | 380/279 |
| 2008/0273696 A1 * | 11/2008 | Greco et al. | 380/44 |
| 2010/0095118 A1 * | 4/2010 | Meka | 713/168 |
| 2011/0173452 A1 * | 7/2011 | Nan et al. | 713/179 |
| 2011/0296172 A1 * | 12/2011 | Fu et al. | 713/156 |
| 2012/0166576 A1 * | 6/2012 | Orsini et al. | 709/217 |
| 2013/0129087 A1 * | 5/2013 | Qi et al. | 380/44 |
| 2014/0050318 A1 * | 2/2014 | Hayashi et al. | 380/46 |
| 2014/0219443 A1 * | 8/2014 | Brainis et al. | 380/46 |
| 2014/0229736 A1 * | 8/2014 | Asim et al. | 713/171 |

FOREIGN PATENT DOCUMENTS

| | | |
|---|---|---|
| KR | 1020110117169 A | 10/2011 |
| WO | 03090402 A1 | 10/2003 |

OTHER PUBLICATIONS

Wang, Guojun et al., "Hierarchical attribute-based encryption and scalable user revocation for sharing data in cloud servers", Computers & Security 30, Jul. 2011, pp. 320-331.

* cited by examiner

US 9,036,818 B2

PRIVATE KEY GENERATION APPARATUS AND METHOD, AND STORAGE MEDIA STORING PROGRAMS FOR EXECUTING THE METHODS

CROSS-REFERENCE TO RELATED APPLICATION

This application claims priority to and the benefit of Korean Patent Application No. 10-2012-58676 filed on May 31, 2012, the disclosure of which is incorporated herein by reference in its entirety.

BACKGROUND OF THE INVENTION

1. Field of the Invention

The present invention relates generally to a private key generation apparatus and method, encryption, decryption and signature methods based on the method, and storage media storing programs for executing the methods on a computer and, more particularly, to private a private key generation apparatus and method in which key generation units are configured to be hierarchical, encryption, decryption and signature methods based on the method, and storage media storing programs for executing the methods on a computer.

2. Description of the Related Art

Recently, with the development of computer technology and the rapid expansion of communication networks, the security of computer-related resources and data to be sent has attracted attention as an important issue. A scheme for overcoming this problem is an encryption-based system. An encryption system that has made the greatest contribution up to the present is a public key encryption system. The conventional public key system has difficulty managing the certificates of public keys because the public keys of users should be authenticated in advance and certificates with problems should be discarded even before the expiration of their periods of validity. Accordingly, an identity (ID)-based encryption system based on personal IDs was proposed.

The public key-based encryption system uses a method of determining a private key and then computing a public key. In contrast, the ID-based encryption system uses a method of selecting an ID and then computing a private key based on the ID. In this case, a private key generator (PKG) computes the private key based on the ID and issues the private key via a private channel.

Since the conventional ID-based encryption system has the disadvantage of slow processing at a client end, a Trapdoor Discrete Logarithm (TDL)-based new ID-based encryption system was proposed. This TDL-based new ID-based encryption system also has the disadvantage of the slow issuance of private keys. Accordingly, the present invention proposes a new technology that has both efficiency at a user end (client end) and the efficiency of the issuance of keys.

Prior art related to the new technology will now be described. Korean Patent Application Publication No. 2005-0037723 entitled "Method of Distributing Conference Session Keys in Identity Information-based Encryption System" discloses a method of selecting two different temporary private keys, generating a message, and performing a protocol using the temporary private key of a session initiation entity when generating a session key generation variable. This method includes the step of implementing an identity information-based encryption system and the step of performing a key sharing protocol. The identity information-based encryption system is formed of a system for providing signatures. The present invention is different from this prior art technology in that entities for generating private keys are configured to be hierarchical, thereby attempting to reduce the time it takes for a sub-private key generation unit to generate a private key.

Furthermore, Korea Patent Application Publication No. 2011-0117169 entitled "Method and Apparatus for Performing ID-based Authenticated Key Protocol" discloses an ID-based authenticated key agreement protocol that does not undergo a private key escrow problem. This technology is directed to an ID-based authenticated key agreement protocol, and is different from the present invention that allows entities for generating private keys to be hierarchical.

SUMMARY OF THE INVENTION

Accordingly, the present invention has been made keeping in mind the above problems occurring in the prior art, and an object of the present invention is to provide a method and apparatus for generating private keys, which enable the private key generation units of an ID-based encryption technology to be configured to be hierarchical, thereby guaranteeing a low load and the efficiency of the generation of private keys at the client end. Furthermore, another object of the present invention is to provide a method and apparatus for generating private keys, which enable the hierarchical private key generation units to be appropriately combined depending on their purposes and then used in a variety of fields.

In order to accomplish the above objects, the present invention provides a private key generation apparatus, including a root private key generation unit configured to set a root master key and predetermined parameters capable of generating private keys, and to generate a first sub-master key set capable of generating a number of private keys equal to or smaller than a preset limited number; and a sub-private key generation unit configured to share authority to generate private keys with the root private key generation unit by receiving the first sub-master key set from the root private key generation unit, to generate a private key corresponding to a user ID using the first sub-master key set, and to issue the private key to a user; wherein the root private key generation unit receives a sub-private key generation unit ID from the sub-private key generation unit, authenticates the sub-private key generation unit ID, and transmits the first sub-master key set to the sub-private key generation unit if the authentication is successful.

In order to accomplish the above objects, the present invention provides a private key generation method, the private key generation method being performed by a private key generation apparatus that generates private keys corresponding to user IDs using the user IDs as public keys, the method including (a) setting, by a root-private key generation unit, a root master key and predetermined root parameters capable of generating private keys; (b) setting, by a sub-private key generation unit, a number of private key issuance target users and setting predetermined sub-parameters based, and transmitting, by the sub-private key generation unit, the number of private key issuance target users and an ID of the sub-private key generation unit to the root private key generation unit; (c) authenticating, by the root-private key generation unit, the ID of the sub-private key generation unit; (d) if the authentication is successful at step (c), generating, by the root-private key generation unit, a first sub-master key set capable of generating a number of private keys equal to the set number of users using the root parameters and the sub-parameters, and transmitting, by the root-private key generation unit, the first sub-master key to the sub-private key generation unit; and (e) generating, by the sub-private key generation unit, a secret key corresponding to the user ID using the first sub-master key set, and providing, by the sub-private key generation unit, the private key to a user; wherein the sub-private key generation unit shares authority to generate private keys with the root private key generation unit by receiving the first sub-master key set from the root private key generation unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
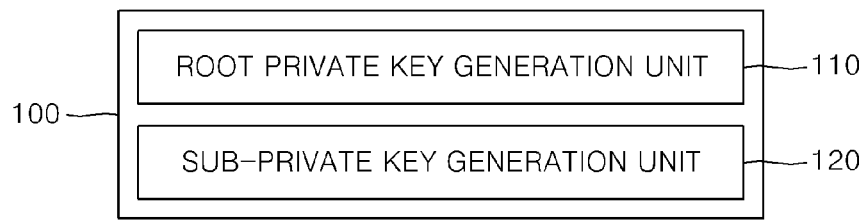
FIG. 1 is a block diagram showing the configuration of a private key generation apparatus according to the present invention.

Reference now should be made to the drawings, throughout which the same reference numerals are used to designate the same or similar components.

A private key generation apparatus and method according to embodiments of the present invention will be described in detail with reference to the accompanying drawings.

Figure 2:
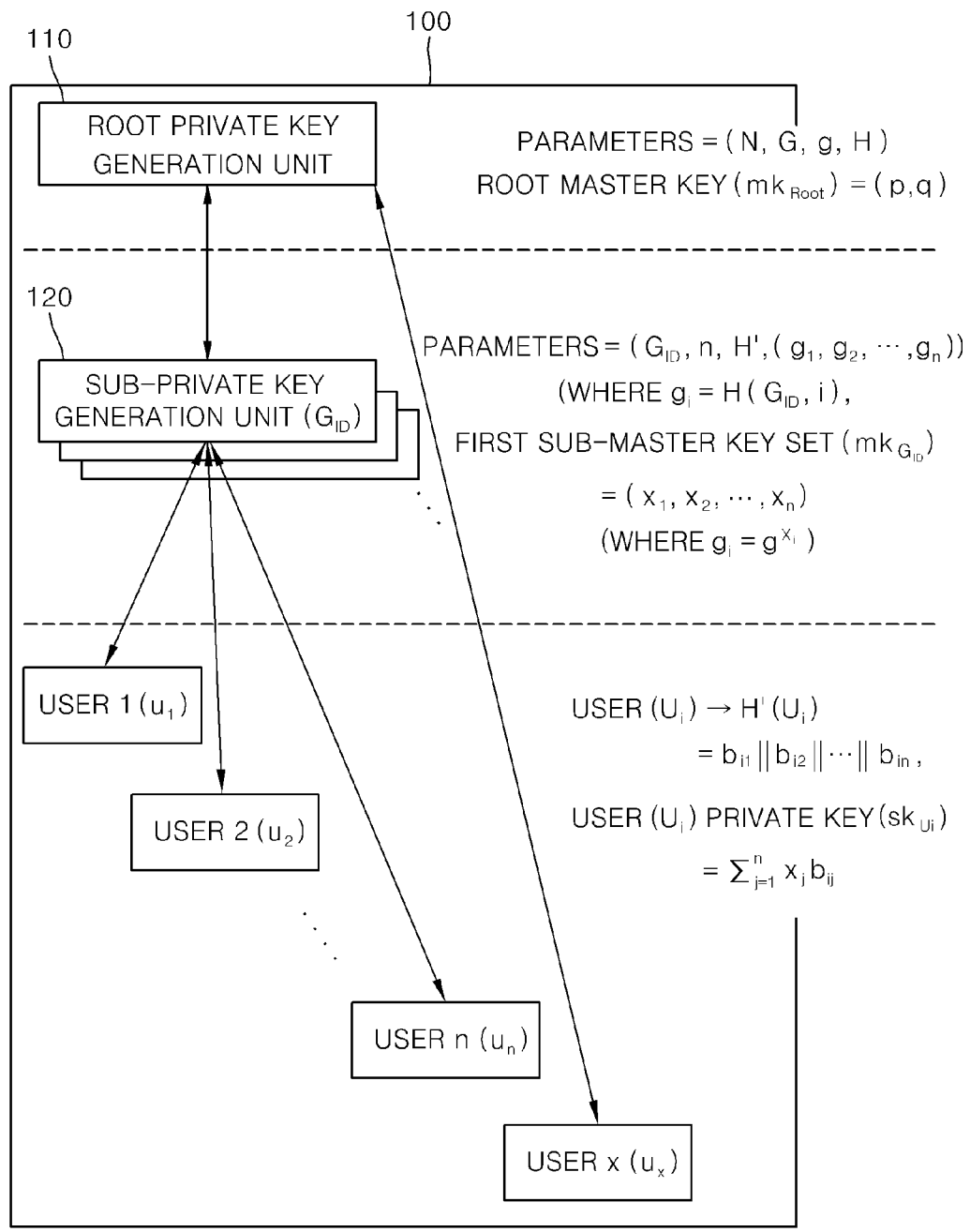
FIG. 2 is a diagram schematically showing a principle by which a private key generation method according to the present invention is implemented.

FIG. 1 is a block diagram showing the configuration of a private key generation apparatus 100 according to the present invention, and FIG. 2 is a diagram schematically showing a principle by which a private key generation method according to the present invention is implemented. Referring to FIG. 1, the private key generation apparatus 100 may include a root private key generation unit 110, and a sub-private key generation unit 120.

The private key generation apparatus 100 generates private keys corresponding to user IDs. The private key generation apparatus 100 according to the present invention includes the root private key generation unit 110 and the sub-private key generation unit 120 that are hierarchical.

The root private key generation unit 110 possesses a root master key $mk_{Root}$ that is capable of generating private keys. In this case, the root master key $mk_{Root}$ is configured in the form of (p, q), where "p" and "q" may be defined as prime numbers that satisfy $p \equiv 1 \pmod{4}$, $q \equiv 3 \pmod 4$ and that are B-smooth. The root master key $mk_{Root}$ has master private information capable of generating private keys and issuing the private keys to users who are issued with private keys directly by the sub-private key generation unit 120 or the root private key generation unit 110. Accordingly, referring to FIG. 2, the root private key generation unit 110 may directly generate a private key corresponding to a user ID and provide the private key to a user x. In this case, the root private key generation unit 110 receives the user ID from the user x, obtains discrete log values while referring to the data of a pre-computation table, and issues the private key to the user x.

Furthermore, the root private key generation unit 110 sets root private key generation unit parameters N, G, g, $H_1$, and $H_2$. These parameters may be defined, as follows: N is a composite number, that is, p×q, G is the largest cyclic subgroup of $Z_N (=\{0, 1, \ldots, n-1\}$, a finite ring); g is the generator of G; $H_1$ is a first hash function, may be a full domain hash function defined as $\{0,1\}^* \rightarrow G$, and is a function of performing mapping to group G capable of solving a discrete log using the ID of a user who is issued with a private key directly by the sub-private key generation unit 120 or root private key generation unit 110 as an input value; and $H_2$ is a second hash function, may be a random hash function defined as $\{0,1\}^* \rightarrow Z_N$, and may be used as a random hash function in a signature method that will be described later. These root private key generation unit parameters N, G, g, $H_1$, and $H_2$ are system parameters that are opened to the public so as to operate the present ID-based encryption system, and are used in operations capable of providing private keys to users who use the sub-private key generation unit 120 or the present ID-based encryption system.

The root private key generation unit 110 issues a first sub-master key set capable of generating a preset limited number of private keys to the sub-private key generation unit 120 that has the authority to issue private keys corresponding to user IDs using the root master key and the predetermined parameters. For this purpose, the root private key generation unit 110 receives the ID $G_{ID}$ of the sub-private key generation unit 120 and information about the number of service users n from the sub-private key generation unit 120, and performs the task of authenticating the ID $G_{ID}$ of the sub-private key generation unit 120. This authentication task may be performed via a non-disclosed channel (a private channel).

Figure 5:
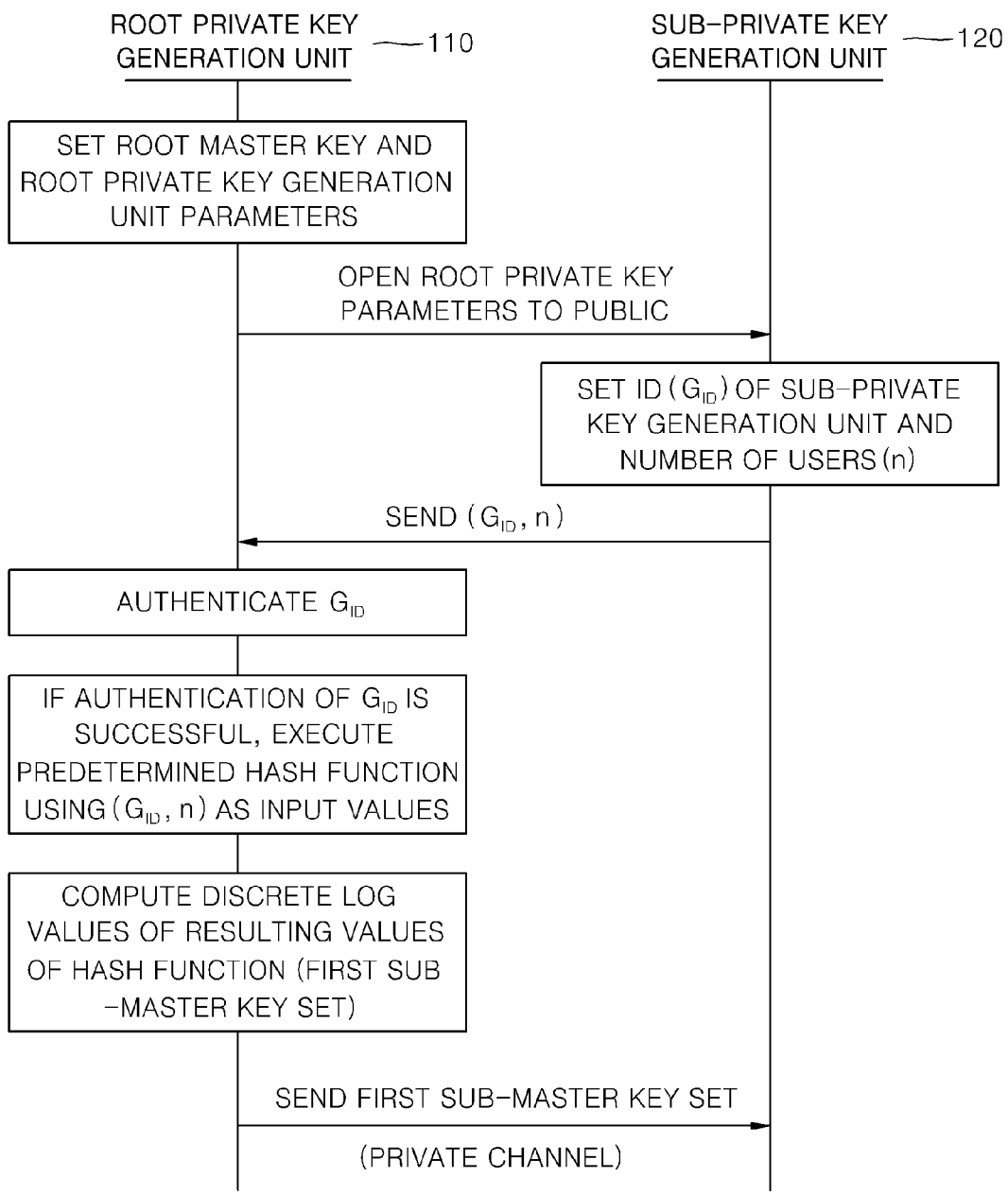
FIG. 5 is a diagram showing a private key generation method according to the present invention.

Referring to FIG. 5, when the above-described authentication of the ID $G_{ID}$ of the sub-private key generation unit 200 has been performed and successful, the root private key generation unit 110 computes the discrete log values of resulting values that are obtained by executing a predetermined hash function using the ID $G_{ID}$ of the sub-private key generation unit 120 and the number of service users n ($G_{ID}$, n) as input values. In this case, n discrete log values can be obtained as a result of performing a hash function using a total of seven values ($G_{ID}$, 1) to ($G_{ID}$, n) as input values. The discrete log values obtained as described above are the first sub-master key set $mk_{G_{ID}}$. The root private key generation unit 110 sends the first sub-master key set $mk_{G_{ID}}$ to the sub-private key generation unit 120 via a private channel. Here, $mk_{G_{ID}}$ is ($x_1$, $x_2, \ldots, x_n$), where $g_i = g^{x_i}$ and $x_i = \log_g g_i$ ($1 \leq i \leq n$).

In the above case, a full domain hash function may be used as the predetermined hash function. Sub-private key generation unit parameters $g_i$ ($1 \leq i \leq n$) may be generated by computing $g_i = H_1(G_{ID}, i)$, where $H_1$ may be a first hash function, that is, a full domain hash function defined as $\{0, 1\}^* \rightarrow G$, and $G_{ID}$ denotes the ID of the sub-private key generation unit 120.

The sub-private key generation unit 120 is provided with the first sub-master key set, generates a number of private keys equal to or smaller than the preset number of users, corresponding to user IDs, and issues the private keys to users. The sub-private key generation unit 120 may be set for each service provider. Here, the service provider may be any one of a variety of applications implemented on a mobile terminal, but is not limited thereto.

The sub-private key generation unit 120 obtains a private key corresponding to the user ID by computing a bit representation value for a user ID assigned to the sub-private key generation unit 120 using a predetermined hash function and linearly combining the bit representation value with the first sub-master key set, and sends the private key to the user. That is, the sub-private key generation unit 120 computes the private key $$sk_{U_{ID}}\left(=\sum_{i=1}^{n}x_{i}b_{i}\right)$$

corresponding to the user ID $U_{ID}$ by computing $H_3(U_{ID})=b_1b_2\ldots b_n$ (a binary representation, that is, $b_i \in \{0,1\}$) for the user ID $U_{ID}$ using the random hash function $H_3$ and linearly combining the computed values $b_1, b_2, \ldots, b_n$ and the first sub-master keys $x_1, x_2, \ldots, x_n$, and sends the private key $sk_{U_{ID}}$ via a channel that is not opened to the user (a private channel). Here, $H_3$ is a third hash function, and may be a random hash function defined as $\{0,1\}^* \rightarrow \{0,1\}^n$. In this case, the resulting values of the random hash function $H_3$ may be in a w-sparse form in which only w values ($1 \le w \le n$) of $b_i$ ($1 \le i \le n$) are set to a value other than "0," that is, "1," for convenience of computation.

Accordingly, the ID-based encryption technology defined in the conventional Trapdoor Discrete Logarithm (TDL) group obtains discrete log resulting values while referring to a pre-computation table. In contrast, the present invention can generate a private key using the bit summation computation of the sub-private key generation unit 120 and thus the time it takes to generate a private key is reduced.

If the sub-private key generation unit 120 issues private keys to a number of users larger than a preset number, there is concern about the exposure of the private keys in terms of cryptology. Accordingly, if the sub-private key generation unit 120 desires to issue a number of private keys larger than a preset number, the sub-private key generation unit 120 may request the root private key generation unit 110 to issue an additional sub-master key set. When the root private key generation unit 110 receives the request for the issuance of the sub-master key set from the authenticated sub-private key generation unit 120, the root private key generation unit 110 may generate a second sub-master key set capable of allowing a number of private keys equal to the number of additionally requested users to be generated, and provide the second sub-master key set to the sub-private key generation unit 120. In this case, a charging unit (not shown) may charge for the second sub-master key set. A charge may be proportional to the number of users to which private keys can be issued, and may be determined in the form of the number of users * unit price. The charging unit may be included in the loop private key generation unit 110, or may be provided independently. Since the sub-private key generation unit 120 is prohibited from freely increasing the number of users without the permission of the root private key generation unit 110 by the adoption of the charging unit, a clear charging system can be established.

An encryption and decryption apparatus (not shown) and a signature apparatus (not shown) may be implemented based on the private key generation apparatus 100. The encryption and decryption apparatus may include an encryption unit and a decryption unit, and the signature apparatus may include a signature generation unit and a signature verification unit.

When an encrypted message of a message m is sent to a user having a user ID of $U_{ID}$, the encryption unit of a sender first computes the bit representation $H_3(U_{ID})=b_1b_2\ldots b_n$ of the user ID $U_{ID}$ by computing a hash function using the user ID $U_{ID}$ as an input value. The encryption unit of the sender computes $$\prod_{i=1}^{n}(g^{x_i})^{b_i}=g^{\sum_{i=1}^{n}x_ib_i}=:S_{U_{ID}}$$

using the disclosed system parameters of the sub-private key generation unit 120, including the sender and the recipient $U_{ID}$, and the bit representation value. The encryption unit of the sender selects a random value r, generates the encrypted message $(g^r, m \cdot (S_{U_{ID}})^r)$ of the message m, and then sends the encrypted message to the recipient.

The decryption unit of the recipient who receives the encrypted message receives a pair of encrypted messages (U, V) that are composed of two elements of the ring $Z_N$. The decryption unit of the recipient computes $$V/U^{sk_{U_{ID}}}$$

using a private key $$sk_{U_{ID}}\left(=\sum_{i=1}^{n}x_{i}b_{i}\right)$$

corresponding to the user ID $U_{ID}$ that is issued by the sub-private key generation unit 120. In this case, since the encrypted message generated via a normal encryption process is $(U=g^r, V=m \cdot (S_{U_{ID}})^r)$ and the private key $sk_{U_{ID}}$ is a discrete log value in which the base of $sk_{U_{ID}}$ is g (that is, $$(\text{that is, } sk_{U_{ID}} = g^{sk_{U_{ID}}})$$

for a user who possesses a legitimate private key corresponding to $U_{ID}$, the result of the computation of $$V/U^{sk_{U_{ID}}}$$

is the same as the message m.

The signature generation unit selects a random value r based on the private key $$sk_{U_{ID}}\left(=\sum_{i=1}^{n}x_{i}b_{i}\right)$$

corresponding to the user ID $U_{ID}$, computes $e=H_2(g^r,m)$, and then generates a signature $\sigma_{U_{ID},m}(=g^r, r-e \cdot sk_{U_{ID}})$. The signature verification unit of the recipient who has received the signature verifies whether the signature is valid by computing $g^V \cdot (S_{U_{ID}})^{H_3(U,m)}$ for the generated signature $\sigma_{U_{ID},m}(=(U, V))$ using the ID $U_{ID}$ of the sender and determining whether $g^V \cdot (S_{U_{ID}})^{H_3(U,m)}$ is the same as U (whether $U=g^V \cdot (S_{U_{ID}})^{H_3(U,m)}$). Here, m is a message, r is a random value ($r \in Z_N$), and $$S_{U_{ID}} = \prod_{i=1}^{n}(g^{x_i})^{b_i} = g^{\sum_{i=1}^{n}x_i b_i}.$$

Figure 3:
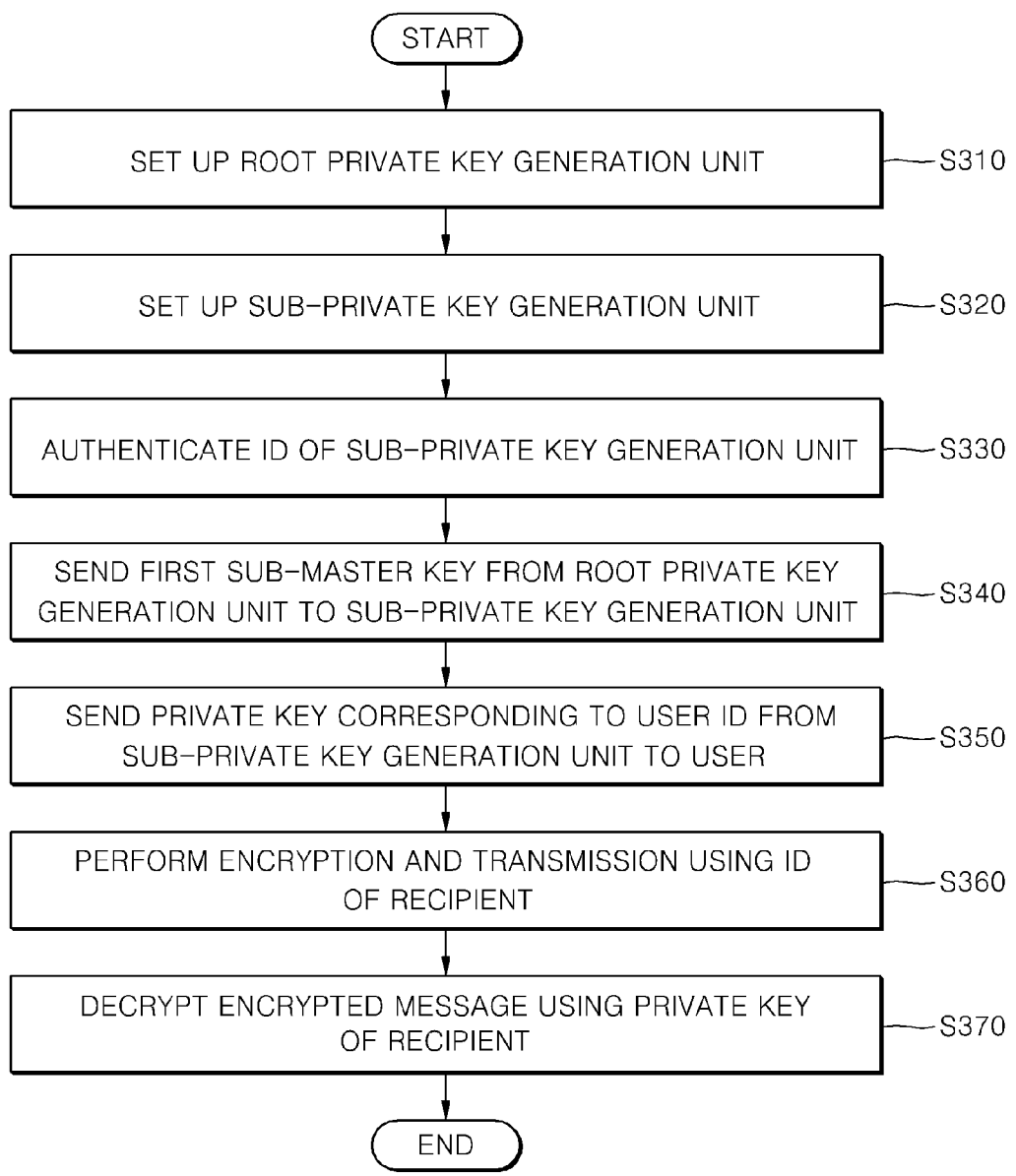
FIGS. 3 to 4 are diagrams showing an encryption and decryption process and a signature generation and transmission process based on a private key generated using the private key generation method according to the present invention.
Figure 4:
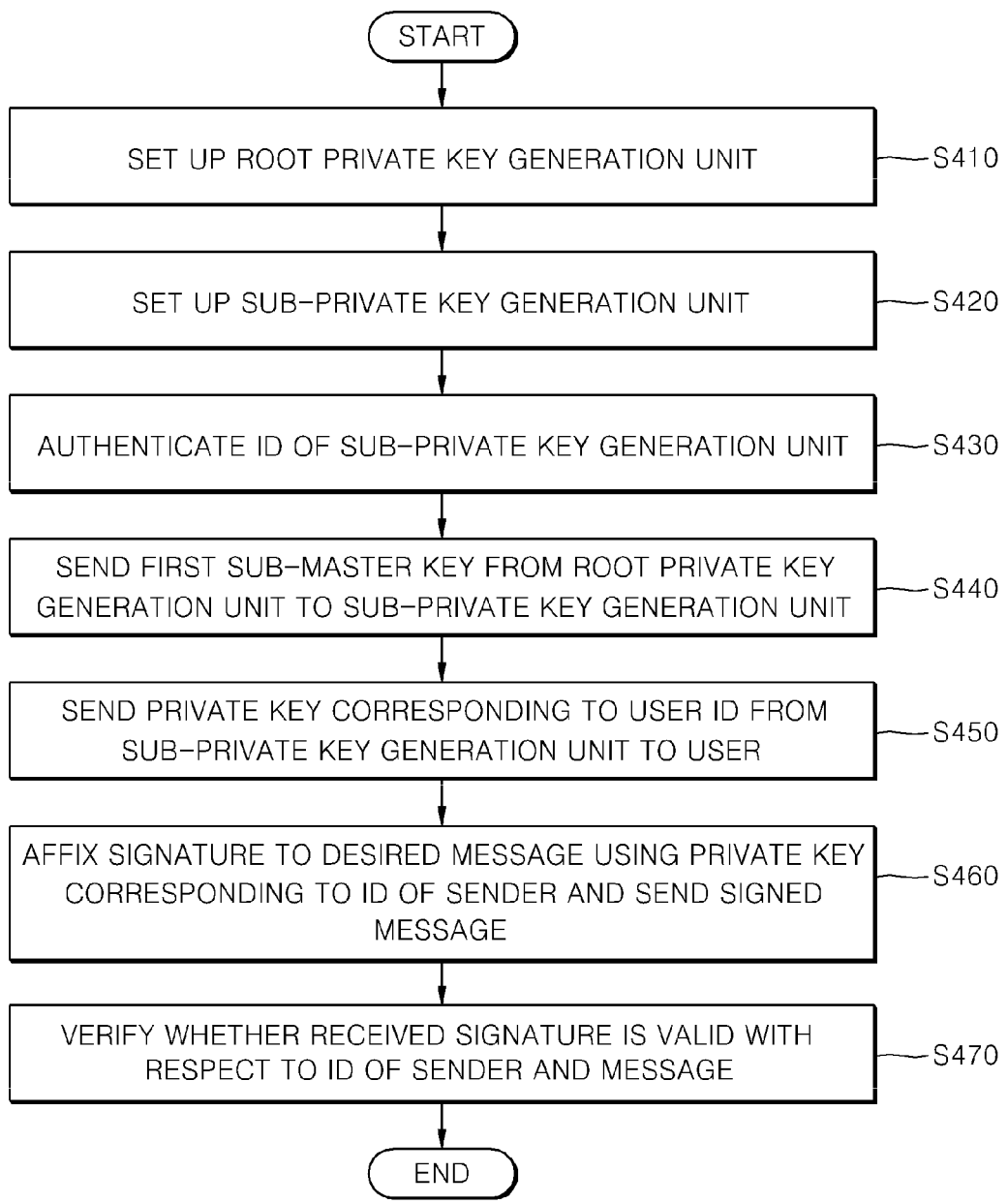

FIGS. 3 to 4 are diagrams showing an encryption and decryption process and a signature generation and transmission process based on a private key generated using the private key generation method according to the present invention, and FIG. 5 is a diagram showing a private key generation method according to the present invention.

Referring FIGS. 3 to 5, the root private key generation unit 110 is set up to set a root master key capable of generating private keys, set predetermined root parameters, and issue a first sub-master key set capable of generating a limited number of private keys to the sub-private key generation unit 120 that has the authority to issue a number of private keys equal to or smaller than a preset number at steps S310 and S410.

Furthermore, the sub-private key generation unit 120 is set up to set the number of users who desire to have the authority to issue a private key in advance, receive the first sub-master key set, generate the number of private keys equal to or smaller than the preset number, corresponding to user IDs, and issue the private keys to the users at steps S320 and S420.

The root private key generation unit 110 receives the ID of the sub-private key generation unit and the preset number of users from the sub-private key generation unit parameters and authenticates the ID of the sub-private key generation unit at steps S330 and S430, and sends the first sub-master key set, which was obtained by computing the discrete log values of output values obtained by executing a predetermined hash function, to the sub-private key generation unit 120 at steps S340 and S440. If the authentication of the ID of the sub-private key generation unit fails, the issuance of the sub-master key set to the sub-private key generation unit 120 is stopped.

The sub-private key generation unit 120 obtains a bit representation value using a predetermined hash function with respect to the user ID assigned to the sub-private key generation unit 120, obtains a private key corresponding to the user ID by linearly combining the bit representation value and the first sub-master key set, and sends the private key to a user at steps S350 and S450.

When encryption and decryption technology is implemented based on the above-described method of issuing a private key, a message is encrypted using a recipient ID and then sent at step S360. When the encrypted message is received, the encrypted message is decrypted using the private key corresponding to the recipient ID at step S370. Furthermore, when a signature technology is implemented based on the above-described method of issuing a private key, a signature is generated in a message to be sent using a private key corresponding to the user ID of a user who desires to send the message and then the message is sent at step S460. Then it is verified whether the received signature is effective for the user ID of the user who sent the message and the message at step S470.

The present invention may be implemented as computer-readable code stored in a computer-readable storage medium. The computer-readable storage medium includes all types of storage devices in which computer system-readable data is stored. Examples of the computer-readable storage medium are Read Only Memory (ROM), Random Access Memory (RAM), Compact Disk-Read Only Memory (CD-ROM), magnetic tape, a floppy disk, and an optical data storage device. Furthermore, the computer-readable storage medium may be implemented as carrier waves (for example, in the case of transmission over the Internet). Moreover, the computer-readable medium may be distributed across computer systems connected via a network, so that computer-readable code can be stored and executed in a distributed manner.

The method and apparatus for generating private keys according to the present invention has the advantage of guaranteeing a low load and the efficiency of the generation of private keys at the client end because the private key generation units of an ID-based encryption technology are configured to be hierarchical. Furthermore, the method and apparatus for generating private keys according to the present invention has the advantage of enabling the hierarchical private key generation units to be appropriately combined depending on their purposes and then used in a variety of fields.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A private key generation apparatus, comprising:
   a root private key generation unit configured to set a root master key and predetermined parameters capable of generating private keys, and to generate a first sub-master key set capable of generating a number of private keys equal to or smaller than a preset limited number; and
   a sub-private key generation unit configured to share authority to generate private keys with the root private key generation unit by receiving the first sub-master key set from the root private key generation unit, to generate a private key corresponding to a user ID using the first sub-master key set, and to issue the private key to a user;
   wherein the root private key generation unit receives a sub-private key generation unit ID and information about the number of service users from the sub-private key generation unit, authenticates the sub-private key generation unit ID, and transmits the first sub-master key set to the sub-private key generation unit if the authentication is successful,
   wherein at least one of the root private key generation unit and the sub-private key generation unit is implemented as a hardware component.

2. The private key generation apparatus of claim 1, wherein the sub-private key generation unit generates the private key corresponding to the user ID by linearly combining a bit representation value obtained by applying a hash function to the user ID and the first sub-master key set.

3. The private key generation apparatus of claim 1, wherein the root private key generation unit, if a request for issuance of an additional sub-master key set is input by the sub-private key generation unit so as to provide a number of private keys larger than the preset limited number, generates a second sub-master key set capable of generating a number of private keys equal to a number of additionally requested users and provides the second sub-master key set to the sub-private key generation unit.

4. The private key generation apparatus of claim 3, further comprising a charging unit configured to charge for the second sub-master key set.

5. The private key generation apparatus of claim 1, wherein the root private key generation unit directly generates a private key corresponding to a user ID using the root master key and issues the private key to a user who does not fall within a preset range of private key issuance target users.

6. The private key generation apparatus of claim 1, wherein the first sub-master key is provided to the sub-private key generation unit via a first private channel, and the private key corresponding to the user ID is issued to the user via a second private channel.

7. The private key generation apparatus of claim 1, wherein the root private key generation unit issues the first sub-master key set $mk_{G_{ID}}$ using discrete log values for a base g that belong to sub-parameters of the predetermined parameters;

wherein $mk_{G_{ID}} = (x_1, x_2, \ldots, x_n)$ (where $g_i = g^{x_i}$, and $x_i = \log_g g_i$ ($1 \le i \le n$)).

8. The private key generation apparatus of claim 1, wherein the sub-private key generation unit computes the private key $$sk_{U_{ID}}\left( = \sum_{i=1}^{n} x_i b_i \right)$$

corresponding to the user ID $U_{ID}$ by computing $H_3(U_{ID}) = b_1 b_2 \ldots b_n$ (a binary representation, that is, $b_i \in \{0, 1\}$) for the user ID $U_{ID}$ using a predetermined hash function $H_3$ and linearly combining the computed values $b_1, b_2, \ldots, b_n$ and the first sub-master key $x_1, x_2, \ldots, x_n$;

where $H_3$ is a random hash function defined as $\{0,1\}^* \to \{0, 1\}^n$, and n ($1 \le i \le n$) is the preset number of users.

9. A private key generation method, the private key generation method being performed by a private key generation apparatus that generates private keys corresponding to user IDs using the user IDs as public keys, the method comprising:
 (a) setting, by a root-private key generation unit, a root master key and predetermined root parameters capable of generating private keys;
 (b) setting, by a sub-private key generation unit, a number of private key issuance target users and setting predetermined sub-parameters based, and transmitting, by the sub-private key generation unit, the number of private key issuance target users and an ID of the sub-private key generation unit to the root private key generation unit;
 (c) authenticating, by the root-private key generation unit, the ID of the sub-private key generation unit;
 (d) if the authentication is successful at step (c), generating, by the root-private key generation unit, a first sub-master key set capable of generating a number of private keys equal to the set number of users using the root parameters and the sub-parameters, and transmitting, by the root-private key generation unit, the first sub-master key to the sub-private key generation unit; and
 (e) generating, by the sub-private key generation unit, a secret key corresponding to the user ID using the first sub-master key set, and providing, by the sub-private key generation unit, the private key to a user;
 wherein the sub-private key generation unit shares authority to generate private keys with the root private key generation unit by receiving the first sub-master key set and information about the number of service users from the root private key generation unit.

10. The private key generation method of claim 9, wherein at step (a):
 the root master key $mk_{Root}$ is a prime number pair (p, q) that are B-smooth; and
 the root parameters comprises a composite number $N=(p*q)$, that is, $p \times q$, a largest cyclic subgroup G of Zn, a generator g of G, a first hash function $H_1$, and a second hash function $H_2$;
 wherein $p \equiv 1 \pmod 4$, $q \equiv 3 \pmod 4$, $Z_N = \{0, 1, \ldots, N-1\}$, that is, a finite ring, $H_1$ is a full domain hash function defined as $\{0,1\}^* \to G$, and $H_2$ is a random hash function defined as $\{0,1\}^* \to Z_N$.

11. The private key generation method of claim 9, wherein at step (b):
 the sub-parameters are $g_i$ that is defined using a predetermined hash function based on the preset number of private key issuance target users and service IDs generating the private keys;
 wherein $g_i = H_1(G_{ID}, i)$, n is the preset number of private key issuance target users ($1 \le i \le n$), $H_1$ is a full domain hash function defined as $\{0,1\}^* \to G$, G is a largest cyclic subgroup of Zn, $Z_N = \{0, 1, \ldots, N-1\}$, that is, a finite ring, and $G_{ID}$ is a private key generation service ID.

12. The private key generation method of claim 9, wherein at step (d):
 the first sub-master key set $mk_{G_{ID}}$ is issued using discrete log values for a base g of the sub-parameters;
 wherein $mk_{G_{ID}} = (x_1, x_2, \ldots, x_n)$ (where $g_i = g^{x_i}$, and $x_i = \log_g g_i$ ($1 \le i \le n$)).

13. The private key generation method of claim 9, wherein at step (e):
 the private key $$sk_{U_{ID}}\left( = \sum_{i=1}^{n} x_i b_i \right)$$

corresponding to the user ID $U_{ID}$ is computed by computing $H_3(U_{ID}) = b_1 b_2 \ldots b_n$ (a binary representation, that is, $b_i \in \{0, 1\}$) for the user ID $U_{ID}$ using a predetermined hash function $H_3$ and linearly combining the computed values $b_1, b_2, \ldots$, and the first sub-master key $x_1, x_2, \ldots, x_n$;

where $H_3$ is a random hash function defined as $\{0,1\}^* \to \{0, 1\}^n$, and n ($1 \le i \le n$) is the preset number of users.

14. The private key generation method of claim 13, wherein resulting values of the random hash function $H_3$ are in a w-sparse form in which only w values ($1 \le w \le n$) of $b_i$ ($1 \le i \le n$) are set to "1."

15. The private key generation method of claim 9, further comprising generating a second sub-master key set capable of generating a number of private keys equal to a number of additional users so as to provide a number of private keys larger than the preset limited number.

16. A non-transitory computer-readable storage medium storing a program for executing the private key generation method of claim 9 on a computer.

* * * * *